US012810873B2

(12) United States Patent
Rubin et al.

(10) Patent No.: US 12,810,873 B2
(45) Date of Patent: Nov. 24, 2026

(54) METHODS AND APPARATUS FOR PROCESSING OBJECT-BASED AUDIO AND CHANNEL-BASED AUDIO

(71) Applicant: Dolby International AB, Dublin (IE)

(72) Inventors: Eytan Rubin, Nuremberg (DE); Klaus Peichl, Fürth (DE); Dawid Powazka, Wroclaw (PL)

(73) Assignee: Dolby International AB, Dublin (IE)

( * ) Notice: Subject to any disclaimer, the term of this patent is extended or adjusted under 35 U.S.C. 154(b) by 0 days.

(21) Appl. No.: 18/292,336

(22) PCT Filed: Jul. 21, 2022

(86) PCT No.: PCT/EP2022/070530
§ 371 (c)(1),
(2) Date: Jan. 25, 2024

(87) PCT Pub. No.: WO2023/006582
PCT Pub. Date: Feb. 2, 2023

(65) Prior Publication Data

US 2025/0078846 A1 Mar. 6, 2025

Related U.S. Application Data

(60) Provisional application No. 63/227,222, filed on Jul. 29, 2021.

(51) Int. Cl.
*G10L 19/008* (2013.01)

(52) U.S. Cl.
CPC .................................. *G10L 19/008* (2013.01)

(58) Field of Classification Search
CPC ..... G10L 19/008; G10L 19/18; G10L 19/167; G10L 19/00; G10L 19/002; G10L 19/26;
(Continued)

(56) References Cited

U.S. PATENT DOCUMENTS 6,124,880 A 9/2000 Shafiee
8,185,815 B1 5/2012 Feira
(Continued)

FOREIGN PATENT DOCUMENTS

CN 103187066 A 7/2013
CN 106688251 A 5/2017
(Continued)

OTHER PUBLICATIONS

Nemanja Fimic et al. Implementation of Multi-format Adaptive Streaming Server, 2015 IEEE 5th International Conference on Consumer Electronics—Berlin (ICCE-Berlin), Sep. 6-9, 2015, 3 pages.

*Primary Examiner* — Leshui Zhang

(57) ABSTRACT

The disclosure relates to a method and device for processing object-based audio and channel-based audio. The method comprises receiving a first frame of audio of a first format; receiving a second frame of audio of a second format different from the first format, the second frame for playback subsequent to the first frame; decoding the first frame of audio into a decoded first frame; decoding the second frame of audio into a decoded second frame; and generating a plurality of output frames of a third format by performing rendering based on the decoded first frame and the decoded second frame. The first format may be an object-based audio format and the second format is a channel-based audio format or vice versa.

12 Claims, 5 Drawing Sheets

(58) Field of Classification Search
CPC .......... G06F 3/165; G06F 3/162; H04S 3/008; H04S 7/30; H04R 3/12
USPC ................................ 704/500–504; 381/1–23
See application file for complete search history.

(56) References Cited

U.S. PATENT DOCUMENTS

| | | | | |
|---|---|---|---|---|
| 8,255,226 | B2 | 8/2012 | Singhal | |
| 8,489,760 | B2 | 7/2013 | Zubair | |
| 9,461,812 | B2 | 10/2016 | Poulsen | |
| 9,607,655 | B2 | 3/2017 | Bloch | |
| 9,628,868 | B2 | 4/2017 | Labosco | |
| 9,661,438 | B1 | 5/2017 | Yang | |
| 9,837,094 | B2 | 12/2017 | Subasingha | |
| 10,045,145 | B2 | 8/2018 | Chebiyyam | |
| 10,304,471 | B2 | 5/2019 | Kristofer | |
| 10,504,525 | B2 | 12/2019 | Sun | |
| 2009/0228125 | A1 | 9/2009 | Stewart | |
| 2014/0095178 | A1* | 4/2014 | Beack | G10L 19/20 704/500 |
| 2015/0194158 | A1* | 7/2015 | Oh | G10L 19/008 381/22 |
| 2016/0133267 | A1* | 5/2016 | Adami | G10L 19/008 381/23 |
| 2017/0243596 | A1* | 8/2017 | Eggerding | G10L 19/008 |
| 2017/0302995 | A1* | 10/2017 | Tsukagoshi | G10L 19/167 |
| 2018/0033440 | A1* | 2/2018 | Chinen | G10L 19/008 |
| 2020/0020345 | A1* | 1/2020 | Purnhagen | H04S 5/00 |
| 2021/0029480 | A1* | 1/2021 | Mate | G10L 19/008 |
| 2021/0360348 | A1* | 11/2021 | Luyten | H04H 20/20 |

FOREIGN PATENT DOCUMENTS

| | | | |
|---|---|---|---|
| CN | 108134978 | A | 6/2018 |
| CN | 110447243 | A | 11/2019 |
| CN | 112369042 | A | 12/2022 |
| EP | 2830045 | A1 | 1/2015 |
| JP | 2015531078 | A | 10/2015 |
| JP | 2016525715 | A | 8/2016 |
| JP | 2017526264 | A | 9/2017 |
| KR | 10-2015-0136136 | A | 12/2015 |
| WO | 2011020065 | A1 | 2/2011 |
| WO | 2013006342 | A1 | 1/2013 |
| WO | 2016018787 | A1 | 2/2016 |
| WO | 2021118770 | A1 | 6/2021 |

* cited by examiner

METHODS AND APPARATUS FOR PROCESSING OBJECT-BASED AUDIO AND CHANNEL-BASED AUDIO

CROSS REFERENCE TO RELATED APPLICATIONS

This application is the U.S. national stage entry of International Patent Application No. PCT/EP2022/070530, filed Jul. 21, 2022, which claims priority of U.S. provisional application 63/227,222 filed Jul. 29, 2021, which are hereby incorporated by reference.

TECHNICAL FIELD

The present disclosure generally relates to processing audio coded in different formats. More particularly, embodiments of the present disclosure relate to a method that generates a plurality of output frames by performing rendering based on audio coded in an object-based format and audio coded in a channel-based format.

BACKGROUND

Media content is deliverable via one or more communication networks (e.g., wifi, Bluetooth, LTE, USB) to many different types of playback systems/devices (e.g., televisions, computers, tablets, smart phones, home audio systems, streaming devices, automotive infotainment systems, portable audio systems, and the like) where it is consumed by a user (e.g., viewed or heard by one or more users of a media playback system). In the media delivery chain, adaptive streaming (adaptive bit rate or ABR streaming) allows for improved resource management through adaptive selection of bit rate on a media ladder based on network conditions, playback buffer status, shared network capacity, and other factors influenced by the network.

In a typical ABR streaming application, as network conditions degrade during playback of a media asset (e.g., a video or audio file), the playback device adapts by requesting lower bit rate frames of content (e.g. to maintain Quality of Experience; avoid buffering, etc.). In certain streaming applications, bit rate may be adjusted by delivering lower resolution portions of content (e.g., frames of audio) or by delivering content in a different format which preserves bandwidth (e.g., frames of a lower bit rate audio file format are delivered in place of frame of higher bit rate format).

SUMMARY

It is an object of the present disclosure to provide methods for processing object-based audio and channel-based audio content.

According to one aspect of the present disclosure such method enables switching between object-based audio content (such as Dolby Atmos) and channel-based audio content (such as 5.1 or 7.1 content). This is for example advantageous in the context of adaptive streaming. As an example, while object-based audio content is being streamed (e.g., Dolby Atmos content) to a compatible playback system, such as an automotive playback system or mobile device, the playback system may request and begin receiving lower bit rate channel-based audio frames in response to a reduction in available network bandwidth. Conversely, while channel-based audio content is being streamed (e.g., 5.1 content) to a compatible playback system, the playback system may request and begin receiving object-based audio frames in response to an improvement in available network bandwidth.

However, the inventors have found that, without any special handling of the transitions, discontinuities, mixing of unrelated channels, and unwanted gaps may occur when switching between channel-based audio to object-based audio and vice versa. For example, when transitioning from object-based audio (e.g., Dolby Digital Plus (DD+) with Dolby Atmos content, e.g. DD+ Joint Object Coding (JOC)) to channel-based audio (e.g., Dolby Digital Plus 5.1, 7.1, etc.), a hard end of rear surround/height signals and a hard start of mixed-in signals may occur. Likewise, when transitioning from channel-based audio (e.g., Dolby Digital Plus 5.1, 7.1, etc.) to object-based audio (e.g., Dolby Digital Plus with Dolby Atmos content), a hard end of the mixed-in rear surround/height signals in the 5.1 subset of speakers and a hard start of the rear/surround height speaker feeds may occur. Additionally, when switching from channel-based audio to object-based audio, the channels may not be ordered correctly, leading to audio being rendered in the wrong positions and a mix of unrelated channels for a brief time period.

The present disclosure describes strategies for alleviating the issues when switching between object-based and a channel-based audio that address some of the issues described above and provides several advantages including:

- Gapless and smooth transitions (without glitches and pops)
- Rendering of audio at correct positions.
- Enhanced quality of experience for users
- Reduced CPU and memory requirements
- Efficient use of existing software and hardware components The method of the present disclosure is advantageous when switching between an object-based audio format and a channel-based audio format, particularly in the context of adaptive streaming of object-based audio. However, the invention is not limited to adaptive streaming and can also be applied in other scenarios wherein switching between object-based audio and channel-based audio is desirable.

According to an embodiment of the invention, a method is provided that comprises: receiving a first frame of audio of a first format and receiving a second frame of audio of a second format different from the first format. The second frame is for playback subsequent to the first frame. The first format is an object-based audio format and the second format is a channel-based audio format or vice versa. The first frame of audio is decoded into a decoded first frame and the second frame of audio is decoded into a decoded second frame. A plurality of output frames of a third format is generated by performing rendering based on the decoded first frame and the decoded second frame.

The present disclosure further relates to an electronics device comprising one or more processors and a memory storing one or more programs configured to by executed by the one or more processors, the one or more programs including instructions for performing the method of the invention. The present disclosure further relates to a vehicle comprising said electronics device, such as a car comprising said electronics device.

DETAILED DESCRIPTION

The following description sets forth exemplary methods, parameters and the like. It should be recognized, however, that such description is not intended as a limitation on the scope of the present disclosure but is instead provided as a description of exemplary embodiments.

System

Figure 1:
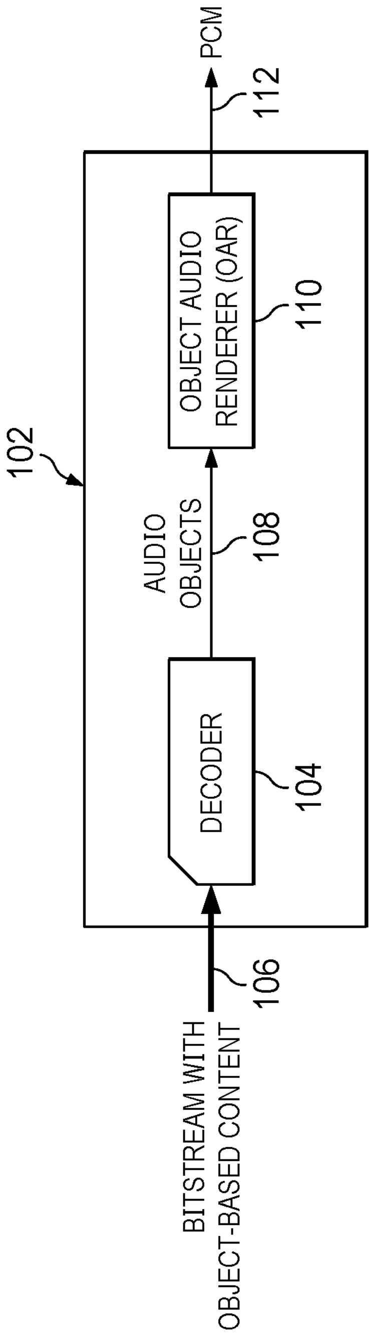
FIG. 1 schematically shows a module for rendering audio capable of switching between channel-based input and object-based input.
Figure 2A:
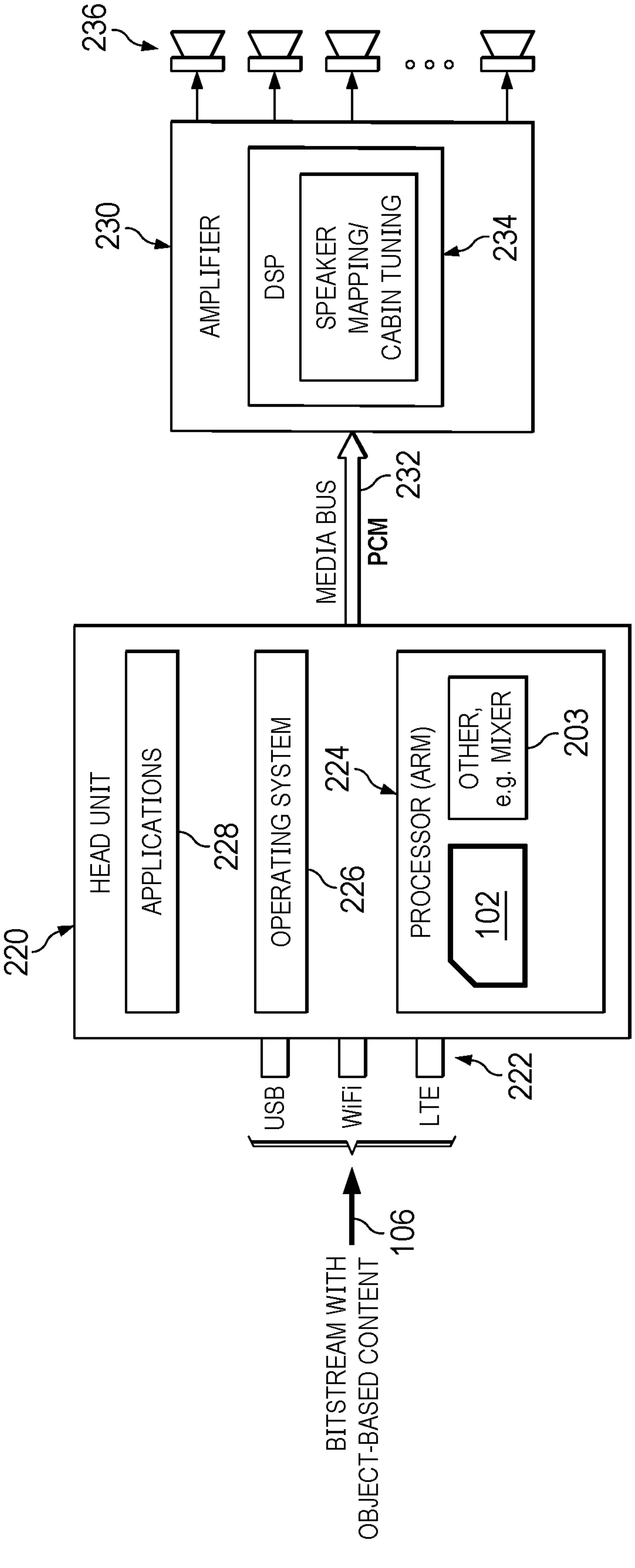
FIG. 2*a* schematically shows an implementation of the module of FIG. 1 in a playback system comprising an amplifier and multiple speakers.
Figure 2B:
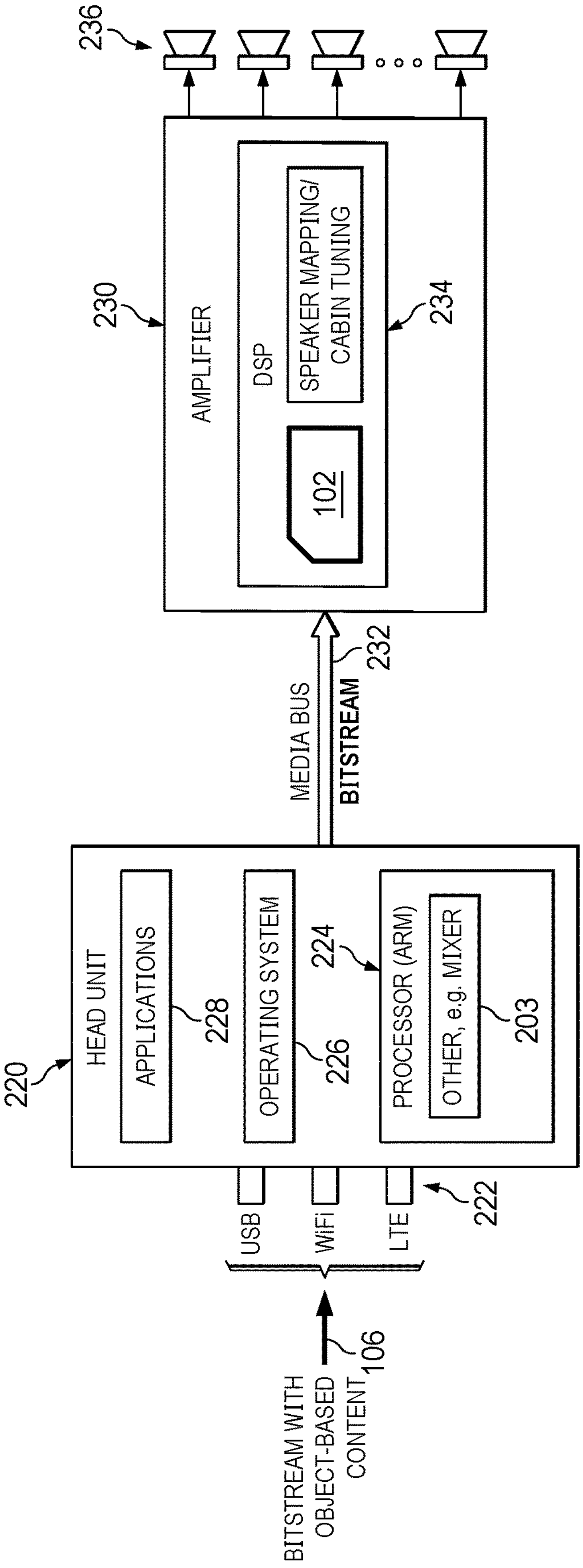
FIG. 2*b* schematically shows an alternative implementation of a playback system including the module of FIG. 1.

FIG. 1 illustrates a functional module 102 that implements aspects of the present disclosure. The module 102 of FIG. 1 may be implemented in both hardware and software (e.g., as illustrated in FIGS. 2*a* and 2*b* and discussed in the corresponding description). The module 102 includes a decoder 104 (e.g., Dolby Digital Plus Decoder) which receives an input bitstream 106 (e.g., Dolby Digital Plus (DD+)) carrying for example object-based audio content, e.g. Dolby Atmos content (768 kbps DD+ Joint Object Coding (JOC), 488 kbps DD+JOC, etc.) or channel-based audio content, e.g. in a 5.1 or 7.1 channel-based format (256 kbps DD+ 5.1, etc.). A DD+JOC bitstream carries a backwards compatible channel-based representation (e.g. a 5.1 format) and in addition metadata for reconstructing an object-based representation (e.g. Dolby Atmos) from said channel-based representation. The decoder 104 decodes a received audio bitstream 106 into either audio objects 108 (illustrated) and/or channels (not illustrated) depending on the received audio. The module 102 includes a renderer 110 (Object audio render/OAR) coupled to the output of the decoder 104. The renderer 110 generates PCM audio 112 (e.g. 5.1.2, 7.1.4, etc.) from the decoder output 104.

FIGS. 2*a* and 2*b* illustrate exemplary embodiments of the invention as implemented in an automotive infotainment system. In some embodiments, a module 102 is implemented in various other playback systems/devices (e.g., televisions, computers, tablets, smart phones, home audio systems, streaming devices, portable audio systems, and the like), which likewise include both hardware and software and involve adaptive streaming of media content. In some embodiments, the invention is implemented as part of a software development kit (SDK) integrated used by a playback system.

In FIG. 2*a*, a device (e.g., a system implementing aspects of the invention) includes a head unit device 220 (e.g., media source device, media playback device, media streaming device, A/V receiver, navigation system, radio, etc.) and an amplifier device 230, each including various hardware and software components. The head unit 220 includes various components such as several communication interfaces 222 for receiving and/or transmitting data (e.g., USB, Wifi, LTE), one or more processors 224 (e.g., ARM, DSP, etc.), and memory (not pictured) storing an operating system 226 and applications 228 (e.g., streaming applications such as Tidal or Amazon Music, media player applications, etc.), and other modules (e.g., module 102 or other modules 203, e.g. a mixer) for implementing aspects of the present disclosure.

As illustrated in FIG. 2*a*, the amplifier device 230 is coupled to the head unit device 220 via one or more media bus interfaces 232 (e.g., Automotive Audio Bus—A2B, Audio Video Bridging—AVB, Media Oriented Systems Transport-MOST, Controller Area Network—CAN, etc.) for receiving and/or transmitting data between components (e.g., PCM audio data between the head unit device 220 and one or more amplifier devices 230). The amplifier device 230 includes a signal processor (DSP) 234 for processing audio (e.g., mapping audio to appropriate speaker configurations, equalization, level-matching, compensating for aspects of the reproduction environment (cabin acoustics, ambient noise), etc.). The amplifier device 230 may also include hardware and software for generating signals for driving a plurality of speakers 236 from processed audio (e.g., audio generated by the DSP 234 based on the received PCM audio from the head unit device 220).

FIG. 2*b* illustrates an alternative implementation of module 102.

As illustrated in FIG. 2*b*, module 102 is located within amplifier device 230 rather than in head unit device 220 as shown in FIG. 2*a*.

Suppression of Switching Artifacts

Artifacts occurring at the switch points between object-based (Atmos) and channel-based decoding/playback are mitigated by modifying both the audio data as well as object audio metadata (OAMD metadata).

The timing diagram 300 (FIG. 3) illustrates how the audio content is divided into frames at different stages of the decoder.

The timing diagram 300 includes three columns that indicate the content type of the input frames: either object-based content (first and last column) or channel-based content (middle column). In the example, six input frames 302 are indicated, with input frames 302-1 and 302-2 comprising object-based content, input frames 302-3 and 302-4 comprising channel-based content and input frames 302-5 and 302-6 comprising object-based content. In the example, the object-based content comprises Dolby Atmos content. However, the invention can be used with other object-based formats as well.

The input frames are extracted from one or more bitstreams. For example, a single bitstream that supports an object-based audio format and a channel-based audio format is used, such DD+JOC (Dolby Digital Plus Joint Object Coding) bitstream or an AC-4 bitstream. In an example, the input frames 302 are received in accordance with an adaptive streaming protocol, such as MPEG-DASH, HTTP Live Streaming (HLS), Low-Latency HLS. In such an example, the decoder may request audio in a channel-based format when available bandwidth is relatively low, while requesting audio in an object-based format when available bandwidth is relatively high.

Figure 3:
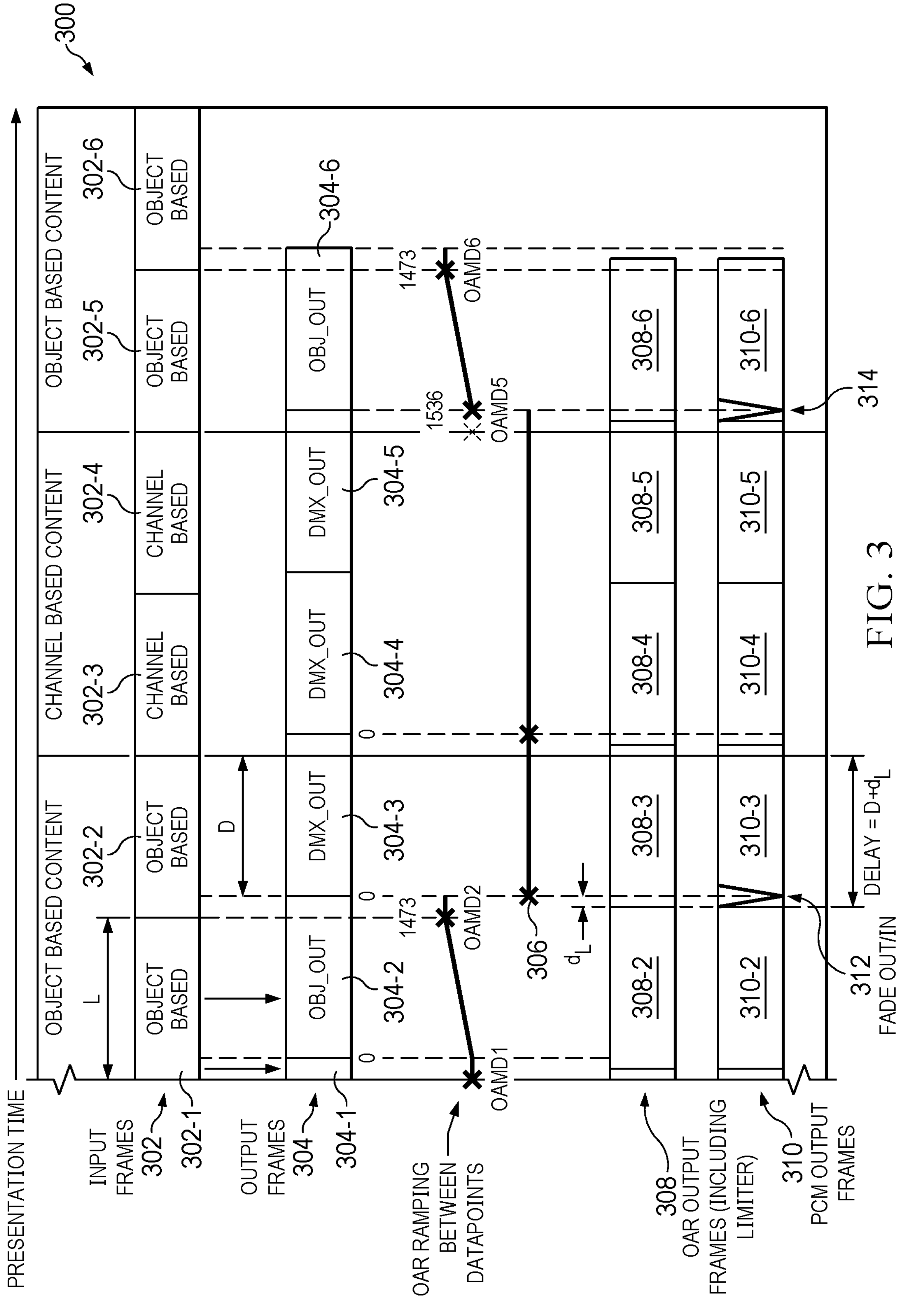
FIG. 3 shows a timing diagram to illustrate the switching between object-based input and channel-based input.

The decoder generates output frames 304 based on the input frames 302. The example of FIG. 3 shows six output frames, 304-1 to 304-6. In the example, only part of input frame 304-1 is shown.

Each input frame 302 and output frame 304 includes L samples. In the example, L is equal to 1536 samples, corresponding to the number of samples used per input frame in a Dolby Digital Plus (DD+) bitstream or a DD+JOC bitstream. However, the invention is not limited to this specific number of samples or to a specific bitstream format.

The timing diagram 300 indicates decoder delay as D. In the example of FIG. 3, the delay D corresponds to 1473 samples. However, the invention is not limited to this specific delay. For example, the decoder delay D corresponds to the latency of a decoding process for decoding a frame of audio.

In diagram 300, the output frames 304 have been shifted to the left by D samples with respect to their actual timing, to better illustrate the relation between input frames 302 and output frames 304.

The first D samples of output frame 304-2 are generated based on the last D samples of input frame 302-1. The remaining R samples of output frame 304-2 are generated based on the first R samples of input frame 302-2, wherein R=L−D. In the example, output frame 304-2 is an object-based output frame generated based on object-based input frames 302-1 and 302-2.

For output frame 304-1, the diagram 300 shows the last R samples only. The last R samples of output frame 304-1 are generated from the first R samples of input frame 302-1.

When decoding the first channel-based frame (frame 302-3), the decoder output switches from "OBJ_OUT" to "DMX_OUT". In the context of the present application, DMX_OUT indicates output that corresponds to a channel-based format, such as 5.1 or 7.1. DMX OUT may or may not involve downmixing at the decoder. In particular, "DMX OUT" may be obtained (a) by downmixing object-based input at the decoder or (b) directly from channel-based input (without downmixing at the decoder).

The decoder generates output frame 304-3 using the object-based input frame 302-2 and channel-based input frame 302-3. The first D samples of frame 304-3 are still generated from object-based content, but already rendered to channels, for example 5.1 or 7.1, i.e. by downmixing the object-based content. The last R samples of output frame 304-3 are generated directly from channel-based input 302-3, i.e. without downmixing by the decoder.

Optionally, an object audio renderer (OAR) is used to render both object-based audio (e.g. frame 304-2) and channel-based audio (e.g. frame 304-3), instead of switching between an OAR and a dedicated channel-based renderer. Using an OAR for both object-based audio and channel-based audio avoids artefacts due to switching between different renderers. When using an OAR for rendering channel-based content, no object audio metadata (OAMD) data is available, so the decoder creates an artificial payload (306) with an offset pointing to the beginning of the frame 304-3 and no ramp (ramp length is set to zero). The artificial payload 106 comprises OAMD with position data that reflects the position of the channels, e.g. according to a 5.1 or 7.1 format. In other words, the decoder generates OAMD for mapping the audio data of frame 304-3 to the positions of the channels of a channel-based format ("bed objects"), e.g. standard speaker positions. In this example, DMX_OUT may thus be considered as channel-based output wrapped in an object-based format, to enable using an OAR to render both channel-based content and object-based content. The artificial payload 306 for channel-based audio generally differs from the preceding OAMD corresponding to object-based audio ("OAMD2" in the example of FIG. 3). Optionally, the OAR includes a limiter. The output frames 308 of the OAR are shown in FIG. 3 as well. The limiter delay is indicated by dL. For purpose of illustration, the OAR output frames 308 have been shifted to the left by dL. OAR output frames 308-2, 308-3, 308-4, 308-5, 308-6 are generated from decoder output frames 304-2, 304-3, 304-4, 304-5, 304-6, respectively, in addition using the corresponding OAMD.

Finally, PCM output frames 310 are generated from the OAR output frames. In case of object-based audio frames 304-2, 304-6, generating the PCM output frames may comprise rendering object-based audio to channels of PCM audio including height channels for driving overhead speakers, such as 5.1.2 PCM audio (8 channels) or a 7.1.4 PCM audio (12 channels).

Discontinuities in both the OAMD data and the PCM data are at least partially concealed by multiplying the signal with a "notch window" 312 consisting of a short fade-out followed by a short fade-in around the switching point. In the example, 32 samples prior to the switching point are still available from the last output 308-2 due to the limiter delay dL, therefore a ramp length of 32 samples (33 including the 0) is used. The output 308-2 is faded out over 32 samples, while the output 308-3 is faded in over 32 samples. The invention is not limited to 32 samples: shorter or longer ramp lengths can be considered. For example, the fade-in and fade-out may have a ramp length of at least 32 samples, such as between 32 and 64 samples or between 32 and 128 samples.

When decoding the first object-based frame (frame 302-5) after some channel-based frames (302-3, 302-4), the decoder output for frame 304-5 is still in "DMX_OUT" format (e.g. 5.1 or 7.1). In the example, the first D samples of output frame 304-5 are generated from the last D samples of channel-based input frame 302-4, while the last R samples of output frame 304-5 are generated by downmixing the first R samples of object-based input frame 302-5. The next output frame 304-6 is in object-based format. The first D samples of 304-6 are generated from the last D samples of input frame 302-5, while the last R samples are generated from the first R samples of input frame 302-6. Both input frames 302-5 and 302-6 are in an object-based format, so no downmixing is applied for generating frame 304-6.

The OAMD data from the bitstream is modified such that it starts at the beginning of the next frame 302-6 (offset D) and indicates a ramp duration of 0 so that no unwanted crosstalk can occur due to ramping towards the incompatible "OBJ_OUT" channel order.

When generating output frame 310-6, a fading notch 314 (similar to fading notch 312) is applied in order to at least partially conceal discontinuities in the signal and the metadata.

OAMD in a bitstream delivering frames of object-based audio (e.g., Atmos content) contains positional data and a gain data for each object at a certain point in time. In addition, the OAMD contains a ramp duration that indicates to the renderer how much in advance the mixer (mixing input objects to output channels) should start transitioning from the previous mixing coefficients towards the mixing coefficients that got calculated from the (new) OAMD. Disabling the OAMD ramp is done by manipulating the ramp duration in the OAMD from the bitstream (e.g., setting the ramp duration to 0 (zero)).

Figure 4:
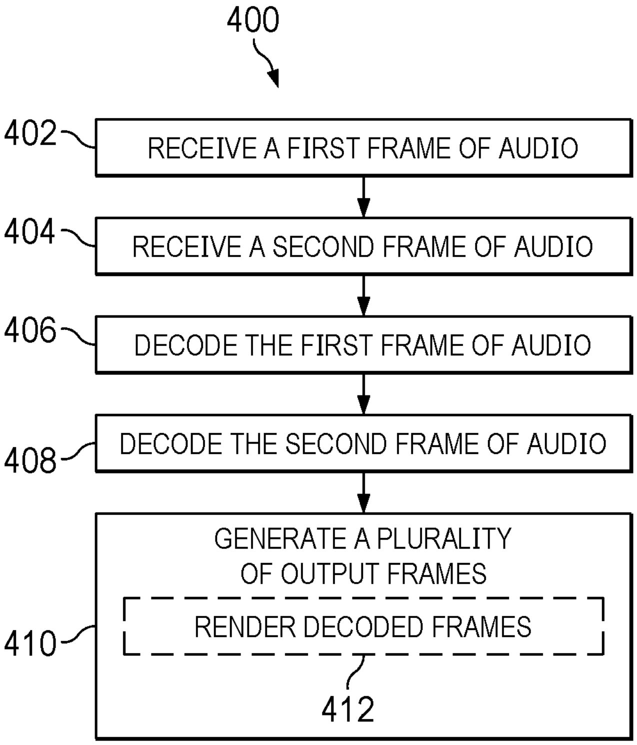
FIG. 4 shows a flow chart illustrating the method according to embodiments of the invention.

FIG. 4 is a flow diagram illustrating process 400 for transitioning between media formats in an adaptive streaming application in accordance with an embodiment of the invention. In some embodiments, process 400 may be performed at an electronic device such as a "Head unit" device 220 (e.g., as illustrated in FIGS. 2*a* and 2*b*). Some operations in process 400 may be combined, the order of some operations may be changed, and some operations may be omitted.

At block 402, the device (head unit 220 and/or amplifier 230 of FIG. 2*a* or FIG. 2*b*) receives a first frame of audio of a first format (e.g., object-based audio, such as Dolby Atmos). In some embodiments, the device is a system includes additional hardware and software in addition to a head unit 220 and/or an amplifier 230.

At block 404, the device receives a second frame of audio of a second format different from the first format (e.g., channel-based audio, such as 5.1 or 7.1, such as DD+ 5.1), the second frame for playback subsequent to the first frame (e.g., immediately subsequent or adjacent to the first frame of audio with respect to an intended playback sequence, following the first frame of audio for playback, subsequent in playback order or sequence). In some embodiments, the first format is an object-based audio format and the second format is a channel-based audio format. In some embodiments, the first format is channel-based audio format and the second format is an object-based audio format.

In some embodiments, the first frame of audio and the second frame of audio are received by the device in a first bitstream (e.g., a DD+ bitstream or DD+JOC bitstream). In some embodiments, the first frame of audio and the second frame of audio are delivered in accordance with an adaptive streaming protocol ((e.g., via a bitstream managed by an adaptive streaming protocol). In some embodiments, the adaptive streaming protocol is MPEG-DASH, HTTP Live Streaming (HLS), Low-Latency HLS (LL-HLS), or the like).

At blocks 406 and 408, the device decodes the first frame of audio into a decoded first frame and the second frame of audio into a decoded second frame, respectively (e.g., using decoder 104 of FIG. 1, e.g. a Dolby Digital Plus Decoder).

In some embodiments, decoding an object-based audio frame includes modifying object audio metadata (OAMD) associated with said frame of object-based audio.

In some embodiments, modifying object audio metadata (OAMD) includes modifying one or more values associated with object positional data. For example, when switching from object-based to channel-based, i.e. when the first frame is in an object-based format and the second frame is in a channel-based format, modifying the OAMD may include: providing OAMD that includes position data specifying the positions of the channels of the channel-based format. In other words, the OAMD specifies bed objects. For example, the OAMD of the object-based format is replaced, for a downmixed portion of the object-based format, by OAMD that specifies bed objects.

In some embodiments, modifying object audio metadata (OAMD) includes setting a ramp duration to zero. The ramp duration is provided in the OAMD for specifying a transition duration from previous rendering parameters (such as mixing coefficients) to current rendering parameters, wherein the previous rendering parameters are derived from previous OAMD and the current rendering parameters are derived from said OAMD. The transition may for example be performed by interpolation of rendering parameter over a time span corresponding to the ramp duration. In a further example, the ramp duration is set to zero when switching from channel-based to object-based, i.e. when the first frame is in the channel-based format and the second frame is in the object-based format.

In some embodiments, setting an object audio metadata (OAMD) ramp duration associated with the second frame of audio to zero is performed while the renderer maintains a non-reset state (e.g., while refraining from resetting the renderer).

In some embodiments, modifying object audio metadata (OAMD) includes applying a time offset (e.g., to align associated OAMD with a frame boundary). The time offset for example corresponds to the latency of the decoding process. In a further example, the offset is applied to the OAMD when switching from channel-based to object-based, i.e. when the first frame is in the channel-based format and the second frame is in the object-based format.

At block, 410 the device generates a plurality of output frames of a third format (e.g., PCM 5.1.4, PCM 7.1.4, etc.) by performing rendering (412) based on the decoded first frame and the decoded second frame (e.g., using audio object render of FIG. 1). In some embodiments, the third format is a format that includes one or more height channels, e.g. for playback using overhead speakers. For example, object-based audio, that may include height information in the form of audio objects, is rendered to 5.1.2 or 7.1.4 output.

In some embodiments, after rendering, the device performs one or more fading operations (e.g., fade-ins and/or fade-outs) to resolve output discontinuities (e.g., hard starts, hard ends, pops, glitches, etc.). In some embodiments, the one or more fading operations (e.g., fade-ins and/or fade-outs) are a fixed length (e.g., 32 samples, less than 32 samples, more than 32 samples). In some embodiments, the one or more fading operations are performed on non-LFE (low frequency effects) channels, i.e. the one or more fading operations are not performed on the LFE channel. In a further embodiment, the fading operations are combined with modifying the OAMD of the object-based audio to set a ramp duration to zero.

In some embodiments, generating a plurality of output frames of a third format includes downmixing the frame of audio of the object-based audio format. In some embodiments, generating a plurality of output frames of a third format includes generating a hybrid output frame that includes two portions, wherein said generating the hybrid output frame comprises: obtaining one portion of the hybrid output frame by downmixing a portion of the frame of audio of the object-based audio format while optionally foregoing downmixing on a remaining portion of the frame of audio of the object-based format; and obtaining the other portion of the hybrid output frame from a portion of the frame of audio of the channel-based audio format.

In a first example, the first frame is of an object-based audio format and the second frame is of a channel-based format. In other words, the input switches from object-based to channel-based. In such example, the hybrid output frame starts with a portion that is generated from downmixing a final portion of the first (object-based) frame and ends with a portion that is obtained from a first portion of the second (channel-based) frame. In a more specific example, the hybrid output frame, the first frame and the second frame each include L samples. The first D samples of the hybrid output frame are obtained from the downmixed last D samples of the first (object-based) frame, while the last L–D samples of the hybrid output frame are obtained from the first L–D samples of the second (channel-based) frame.

In a second example, the first frame is of a channel-based audio format and the second frame is of an object-based format. In other words, the input switches from channel-based to object-based. In such example, the hybrid output frame starts with a portion that is generated from the first (channel-based) frame and ends with a portion that is obtained from downmixing a first portion of the second (object-based) frame. In a more specific example, the hybrid output frame includes L samples, of which the first D samples are obtained from the last D samples of the first (channel-based) frame, while the last L−D samples of the hybrid output frame are obtained from the downmixed first L−D frames of the second (object-based frame).

In some embodiments, a duration of the portion of the frame of audio of the object-based format, i.e. the portion that is downmixed, is based on a latency of an associated decoding process. For example, in the examples above, D may represent a latency or delay of an associated decoding process, and the portion to be downmixed may correspond to e.g. D or L−D.

In some embodiments, the plurality of outputs frames includes PCM audio. In some embodiments, the PCM audio is subsequently processed by the device to generate speaker signals appropriate for a specific reproduction environment (e.g., a particular speaker configuration in a particular acoustic space). For example, a system for reproduction comprises multiple speakers for playback of a 5.1.2 format, a 7.1.4 format or other immersive audio format. A speaker system for playback of a 5.1.2 format may for example include a left (L) speaker, a center (C) speaker and a right (R) speaker, a right surround (Rs) speaker and a left surround (Ls) speaker, a subwoofer (low-frequency effects, LFE) and two height speakers in the form of a Top Left (TL) and a Top Right (TR) speaker. However, the present disclosure is not limited to a specific audio system or a specific number of speakers or speaker configuration.

It should be understood that the particular order in which the operations in FIG. 4 have been described is exemplary and not intended to indicate that the described order is the only order in which the operations could be performed. One of ordinary skill in the art would recognize various ways to reorder the operations described herein, as well as excluding certain operations. For brevity, these details are not repeated here.

The method described in the present disclosure may be implemented in hardware or software. In an example, an electronics device is provided that comprises one or more processors and a memory storing one or more programs configured to by executed by the one or more processors, the one or more programs including instructions for performing any of the methods described in the present disclosure. Such electronics device may be used for implementing the invention in a vehicle, such as a car.

In an embodiment, the vehicle may comprise a loudspeaker system for playback of audio. For example, the loudspeaker system includes surround loudspeakers and optionally height speakers, for playback. The electronics device implemented in the vehicle is configured to receive an audio stream by means of adaptive streaming, wherein the electronics device requests audio in a channel-based format when available bandwidth is relatively low, while requesting audio in an object-based format when available bandwidth is relatively high. For example, when the available bandwidth is lower than a first threshold, the electronics device requests audio in a channel-based format (e.g. 5.1 audio), while when the available bandwidth exceeds a second threshold, the electronic device requests audio in an object-based format (e.g. DD+ JOC). The electronics device implements the method of the present disclosure for switching between object-based and channel-based audio, and the speaker system of the vehicle is provided with the output frames generated by the method. The output frames may be provided directly to the speaker system of the vehicle, or further audio processing steps may be performed. Such further audio processing steps may for example include speaker mapping or cabin tuning, as exemplified in FIG. 2*a*.

As another example, in case the loudspeaker system does not comprises overhead speakers, the rendered audio may be subjected to an audio processing method that adds height cues to provide a perception of sound height, such as the method described in U.S. 63/291,598, filed 20 Dec. 2021, which is hereby incorporated by reference.

Generalizations

As used herein, unless otherwise specified the use of the ordinal adjectives "first", "second", "third", etc., to describe a common object, merely indicate that different instances of like objects are being referred to, and are not intended to imply that the objects so described must be in a given sequence, either temporally, spatially, in ranking, or in any other manner.

In the claims below and the description herein, any one of the terms comprising, comprised of or which comprises is an open term that means including at least the elements/features that follow, but not excluding others. Thus, the term comprising, when used in the claims, should not be interpreted as being limitative to the means or elements or steps listed thereafter. For example, the scope of the expression a device comprising A and B should not be limited to devices consisting only of elements A and B. Any one of the terms including or which includes or that includes as used herein is also an open term that also means including at least the elements/features that follow the term, but not excluding others. Thus, including is synonymous with and means comprising.

As used herein, the term "exemplary" is used in the sense of providing examples, as opposed to indicating quality. That is, an "exemplary embodiment" is an embodiment provided as an example, as opposed to necessarily being an embodiment of exemplary quality.

It should be appreciated that in the above description of exemplary embodiments of the invention, various features of the invention are sometimes grouped together in a single embodiment, figure, or description thereof for the purpose of streamlining the disclosure and aiding in the understanding of one or more of the various inventive aspects. This method of disclosure, however, is not to be interpreted as reflecting an intention that the claimed invention requires more features than are expressly recited in each claim. Rather, as the following claims reflect, inventive aspects lie in less than all features of a single foregoing disclosed embodiment. Thus, the claims following the Detailed Description are hereby expressly incorporated into this Detailed Description, with each claim standing on its own as a separate embodiment of this invention.

Furthermore, while some embodiments described herein include some, but not other features included in other embodiments, combinations of features of different embodiments are meant to be within the scope of the invention, and form different embodiments, as would be understood by those skilled in the art. For example, in the following claims, any of the claimed embodiments can be used in any combination.

Furthermore, some of the embodiments are described herein as a method or combination of elements of a method that can be implemented by a processor of a computer system or by other means of carrying out the function. Thus, a processor with the necessary instructions for carrying out such a method or element of a method forms a means for carrying out the method or element of a method. Furthermore, an element described herein of an apparatus embodiment is an example of a means for carrying out the function performed by the element for the purpose of carrying out the invention.

In the description provided herein, numerous specific details are set forth. However, it is understood that embodiments of the invention may be practiced without these specific details. In other instances, well-known methods, structures and techniques have not been shown in detail in order not to obscure an understanding of this description.

Similarly, it is to be noticed that the term coupled, when used in the claims, should not be interpreted as being limited to direct connections only. The terms "coupled" and "connected," along with their derivatives, may be used. It should be understood that these terms are not intended as synonyms for each other. Thus, the scope of the expression a device A coupled to a device B should not be limited to devices or systems wherein an output of device A is directly connected to an input of device B. It means that there exists a path between an output of A and an input of B which may be a path including other devices or means. "Coupled" may mean that two or more elements are either in direct physical or electrical contact, or that two or more elements are not in direct contact with each other but yet still co-operate or interact with each other.

Thus, while there has been described specific embodiments of the invention, those skilled in the art will recognize that other and further modifications may be made thereto without departing from the spirit of the invention, and it is intended to claim all such changes and modifications as falling within the scope of the invention. For example, any formulas given above are merely representative of procedures that may be used. Functionality may be added or deleted from the block diagrams and operations may be interchanged among functional blocks. Steps may be added or deleted to methods described within the scope of the present invention. For example, the multiple decoding steps describe with respect to FIG. 4 may be performed concurrently, rather than sequentially or the decoding of the first audio frame (406) may occur after prior to receiving the second audio frame.

The invention claimed is:

1. A method comprising:

receiving a first frame of audio of a first format;

receiving a second frame of audio of a second format different from the first format, the second frame for playback subsequent to the first frame;

decoding the first frame of audio into a decoded first frame;

decoding the second frame of audio into a decoded second frame; and generating a plurality of output frames of a third format by performing rendering based on the decoded first frame and the decoded second frame, wherein the first format is an object-based audio format and the second format is a channel-based audio format or the first format is a channel-based audio format and the second format is an object-based audio format, wherein generating the plurality of output frames of a third format includes generating a hybrid output frame that includes two portions, said generating the hybrid output frame comprises:

obtaining one portion of the hybrid output frame by downmixing a portion of the frame of audio of the object-based audio format; and obtaining the other portion of the hybrid output frame from a portion of the frame of audio of the channel-based audio format.

2. The method of claim 1, wherein a duration of the portion of the frame of audio of the object-based audio format is based on a latency of an associated decoding process.

3. The method of claim 1, wherein the first frame of audio and the second frame of audio are received in a first bitstream.

4. The method of claim 1, further comprising:

after rendering, performing one or more fading operations to resolve output discontinuities.

5. The method of claim 4, the method further including applying a limiter, wherein the one or more fading operations includes a fade in and fade out, wherein both the fade in and the fade out have a duration equal to a delay of the limiter.

6. The method of claim 1, wherein decoding the frame of audio of the object-based format includes modifying object audio metadata (OAMD) associated with the frame of audio of the object-based format.

7. The method of claim 6, wherein when the first frame is of the channel-based format, and the second frame is of the object-based format, modifying the OAMD associated with the frame of audio of the object-based format includes at least one of:

applying, to the OAMD associated with the frame of audio of the object-based format, a time offset corresponding to a latency of the decoding process; and setting a ramp duration specified in the OAMD of the frame of audio of the object-based format to zero, wherein the ramp duration specifies the time to transition from previous OAMD to the OAMD of the frame of audio of the object-based format.

8. The method of claim 6, wherein when the first frame is of the object-based format, and the second frame is of the channel-based format, modifying the OAMD associated with the frame of audio of the object-based format includes:

providing OAMD that includes position data specifying the positions of the channels of the channel-based format.

9. The method of claim 1, wherein the first frame of audio and the second frame of audio are delivered in accordance with an adaptive streaming protocol.

10. An electronic device, comprising:

one or more processors; and a memory storing one or more programs configured to by executed by the one or more processors, the one or more programs including instructions for:

receiving a first frame of audio of a first format;

receiving a second frame of audio of a second format different from the first format, the second frame for playback subsequent to the first frame;

decoding the first frame of audio into a decoded first frame;

decoding the second frame of audio into a decoded second frame; and generating a plurality of output frames of a third format by performing rendering based on the decoded first frame and the decoded second frame, wherein the first format is an object-based audio format and the second format is a channel-based audio format or the first format is a channel-based audio format and the second format is an object-based audio format, wherein generating the plurality of output frames of a third format includes generating a hybrid output frame that includes two portions, said generating the hybrid output frame comprises:

obtaining one portion of the hybrid output frame by downmixing a portion of the frame of audio of the object-based audio format; and obtaining the other portion of the hybrid output frame from a portion of the frame of audio of the channel-based audio format, wherein the first format is an object-based audio format and the second format is a channel-based audio format and the first D samples of the hybrid output frame are obtained from the downmixed last D samples of the first frame, and the last L−D samples of the hybrid output frame are obtained from the first L−D samples of the second frame, where L is a total number of samples in the frame and D is a number of delayed samples, wherein the first format is a channel-based audio format and the second format is an object-based audio format, the hybrid output frame includes L samples, of which the first D samples are obtained from the last D samples of the first frame and the last L−D samples of the hybrid output frame are obtained from the downmixed first L−D frames of the second frame.

11. A vehicle comprising the electronic device of claim 10.

12. A non-transitory computer-readable medium storing one or more programs configured to be executed by one or more processors of an electronic device, the one or more programs including instructions for:

receiving a first frame of audio of a first format;

receiving a second frame of audio of a second format different from the first format, the second frame for playback subsequent to the first frame;

decoding the first frame of audio into a decoded first frame;

decoding the second frame of audio into a decoded second frame; and generating a plurality of output frames of a third format by performing rendering based on the decoded first frame and the decoded second frame, wherein the first format is an object-based audio format and the second format is a channel-based audio format or the first format is a channel-based audio format and the second format is an object-based audio format, wherein generating the plurality of output frames of a third format includes generating a hybrid output frame that includes two portions, said generating the hybrid output frame comprises:

obtaining one portion of the hybrid output frame by downmixing a portion of the frame of audio of the object-based audio format; and obtaining the other portion of the hybrid output frame from a portion of the frame of audio of the channel-based audio format.

* * * * *